Feb. 3, 1970  SEIICHI UEMURA ET AL  3,493,549
PROCESS FOR PRODUCING HIGH MOLECULAR WEIGHT HOMOPOLYMERS
OR COPOLYMERS OF ISO-OLEFIN
Filed Sept. 19, 1967
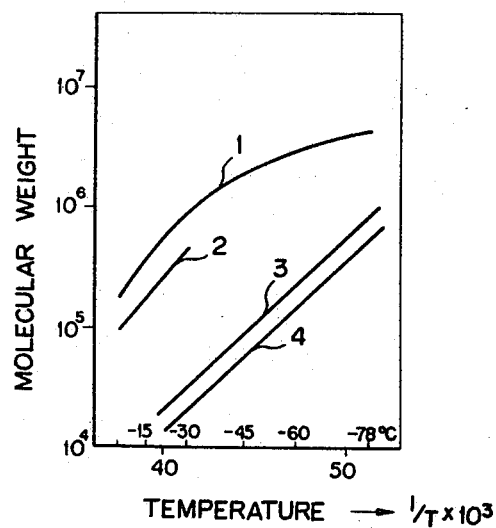
INVENTORS
SEIICHI UEMURA, YOSHIKAZU MURAI,
SHOZO TSUCHIYA, MIKIO TAKAHASHI
BY
ATTORNEYS United States Patent Office 3,493,549
Patented Feb. 3, 1970

3,493,549
PROCESS FOR PRODUCING HIGH MOLECULAR WEIGHT HOMOPOLYMERS OR COPOLYMERS OF ISO-OLEFIN
Seiichi Uemura, Yokohama-shi, Yoshikazu Murai, Tokyo, Shozo Tsuchiya, Kawasaki-shi, and Mikio Takahashi, Yokohama-shi, Japan, assignors to Nippon Petrochemicals Company, Limited, Tokyo, Japan
Filed Sept. 19, 1967, Ser. No. 668,849
Claims priority, application Japan, Oct. 11, 1966, 41/66,567; Jan. 30, 1967, 42/5,594
Int. Cl. C08f 1/72, 15/04
U.S. Cl. 260—85.3
14 Claims

ABSTRACT OF THE DISCLOSURE

Process for producing high molecular weight polymers which comprises polymerizing iso-olefin or copolymerizing iso-olefin with at least one diolefin having 4 to 10 carbon atoms copolymerizable therewith in the presence of a catalyst composition comprising boron trifluoride and a compound of the general formula:

$$M(OR_1)_p(OR_2)_qX_r$$

wherein M represents a metal of the Groups II–VII of the Periodic Table, $R_1$ and $R_2$ which may be the same or different represent a member selected from the group consisting of alkyl, cycloalkyl, aryl and aralkyl groups which may be substituted with halogen, X represents a halogen atom, $p$, $q$ and $r$ represent an integer, respectively, and a sum of $p$, $q$ and $r$ corresponds to the valency of the metal provided that $p$ and $q$ are not zero simultaneously.

BACKGROUND OF THE INVENTION

Field of the invention

This invention relates to a process for producing homopolymers or copolymers of iso-olefin by using a novel catalyst composition.

Description of the prior art

It is known well that a homopolymer or a copolymer of isobutylene having a high molecular weight may be obtained by polymerizing iso-olefin, particularly isobutylene, or copolymerizing isobutlyene with comonomers copolymerizable therewith in the presence of Friedel-Crafts type metal halides.

However, in the polymerization reaction using a catalyst of this type, the transferring and terminating reactions are too violent at high temperatures and thus, useful high polymers can be obtained only by using a very low temperature.

For example, Japanese patent publication No. 7,943/1956 of Esso Research & Engineering Co. describes that a temperature as low as −100° C. is required for the production of butyl rubber by the copolymerization of iso-butylene with a small amount of diolefin using a Friedel-Crafts type metal halide catalyst such as aluminum chloride, titanium tetrachloride and aluminum bromide. Also, it is described on pp. 98–99 of "Polyisobutylen and Isobutylen-Mischpolymerizate" (1959) by H. Güterboch that in the production of high molecular weight polymers such as "Oppanol B" and "Vistanex" (trade names) the polymerization is carried out using boron trifluoride or aluminum chloride at a temperature of −80° to −100° C.

U.S. Patent No. 2,440,498 discloses the use of a catalyst in the form of double salts such as $AlCl_3 \cdot Ti(OC_2H_5)_4$ and $TiBr_4 \cdot TiO(OC_2H_5)_2$ which are soluble in solvents commonly used, in contradistinction of Friedel-Crafts type metal halide catalyst such as aluminum trichloride, aluminum tribromide, aluminum triiodide, and titanium tetrabromide having a poor solubility in hydrocarbon solvents as well as in polar halogenated solvents such as methyl chloride and ethyl chloride.

However, even with such modification as mentioned above, the performance of the catalyst is practically the same as that of aluminum trichloride alone, or even lower than that, and further, the requirement of low temperature for obtaining a high molecular weight polymer is not lessened.

The requirement for such severe temperature condition is obviously undesirable both from commercial and economical points of view, thus, it is highly desirable to obtain a high molecular weight polymer at a relatively higher temperature. Hence, there have been made many attempts to satisfy this requirement.

For example, there have been proposed the use of $(C_2H_5)_2AlCl$ as a catalyst in the polymerization of isobutylene in a polar solvent as described in Japanese patent publication No. 1,144/1963; the use of a catalyst comprising boron trifluoride and an organometallic compound as described in Japanese patent publication No. 15,489/1962; the use of $Al(OH)_2(O\text{-secBu}) \cdot 2BF_3 \cdot TiCl_4$ as a catalyst as reported in IUPC Symposium on Macromolecules, Wiesbaden, Section IIIA–13 (1959), J. Polymer Sci., 53, 281 (1961); and the use of $SnCl_4$—$(C_2H_5)_2AlCl$ as disclosed in U.S. Patent No. 3,006,123.

Although these processes mentioned above are known to produce a high molecular weight polymer at a relatively high temperature, they are remote from practical application in the production of useful high polymers on a commercial scale.

When using such catalyst as aluminum chloride and boron trifluoride which are commnoly used in the commercial production of polymers, the presence of a small amount of water and/or alcohol in the polymerization system is essential for the activation of the catalyst, and, as a matter of fact, it is known that these catalysts do not exhibit any catalytic activity in a complete absence of water and alcohol [cf. P. H. Pleach et al., J. Chem. Soc. (1947)].

Such water and/or alcohols which are indispensable for the proper activation of Friedel-Crafts type catalyst serve effectively in a favorable way only when they are present in small amounts, however, the presence of excessive amounts of these substances tends to lower the polymerization degree and may inhibit the polymerization.

As will be seen above, since the amount of water and alcohol is critical and the polymerization reaction is greatly affected even with a slight change in its amount, very strict control of the amount of water and alcohol in the polymerization system is necessary. The requirement for such strict control of amount of water and alcohols in the polymerization system presents a very difficult problem from the technical standpoint. Thus, it has been desired to obtain a stable catalyst which enables the polymerization reaction without requiring the presence of water, alcohols, etc.

SUMMARY OF THE INVENTION

Accordingly, an object of this invention is to provide a process for producing a high molecular weight homopolymer or copolymer of iso-olefin free from the disadvantages of the prior arts described above.

Another object of this invention is to provide an effective catalyst composition having a high catalytic efficiency and a good stability useful in the production of a high molecular weight homopolymer or copolymer of iso-olefin.

These objects have now been accomplished in accordance with this invention by a process which comprises polymerizing iso-olefin or copolymerizing iso-olefin with at least a diolefin copolymerizable therewith in the presence of a novel catalyst composition comprising boron trifluoride and a compound of a metal of the Groups II–VII of the Periodic Table.

We have conducted a thorough study in the effort to solve the problems described above. As a result, we have found that a novel catalyst composition comprising boron trifluoride and a compound of a metal of the Groups II–VII of the Periodic Table represented by the general formula, $M(OR_1)_p \cdot (OR)_q \cdot X_r$, affords a polymer having an extremely higher molecular weight as compared with those of polymers obtained by using catalysts known heretofore. For example, a polymer having a molecular weight of 200,000 or higher may be produced at a high polymerization temperature as 0° C. in accordance with the process of this invention. The catalyst composition of this invention exhibits stable and high catalytic activity without requiring the presence of water, alcohol, etc. in the polymerization system.

From the unique and surprising features above-mentioned the catalyst composition of this invention is clearly distinguished from catalyst such as aluminum chloride and boron trifluoride, known heretofore.

The catalyst composition used in the process of this invention is composed of boron trifluoride and a metal compound of the general formula:

$$M(OR_1)_p(OR_2)_q \cdot X_r$$

wherein $R_1$ and $R_2$ which may be the same or different represent alkyl groups such as methyl, ethyl, n-propyl, iso-propyl, n-butyl, sec-butyl, tert-butyl, n-amyl, iso-amyl, n-hexyl, iso-hexyl, heptyl and octyl; cycloalkyl groups such as cyclopentyl, methylcyclopentyl, and cyclohexyl; aryl groups such as phenyl, tolyl, naphthyl, xylyl, mesityl and cumenyl; aralyl groups such as benzyl and phenetyl; and halogen-substituted groups of the above-mentioned groups, X represents a halogen atom, M represents a metal of the Groups II–VII of the Periodic Table, $p$, $q$ and $r$ represent an integer, respectively, and a sum of $p$, $q$ and $r$ responds to the valency of the metal provided that $p$ and $q$ are not zero simultaneously.

As described above, when iso-olefin, for example, isobutylene is polymerized or copolymerized with at least one diolefin copolymerizable therewith by using the catalyst composition of this invention, there is obtained a polymer having an extremely higher molecular weight as compared with those of polymers obtained by using known catalysts such as aluminum chloride and boron trifluoride.

As a result, when the catalyst composition of this invention is used, a useful solid elastomer may be obtained even at such a high temperature as above 0° C., at which only a liquid-like or semi-solid polymer of little commercial value having a low molecular weight is usually obtained with the use of known catalyst such as aluminum chloride and boron trifluoride. Furthermore, when the catalyst composition of this invention is used, a large amount of polymer can be produced even in a highly purified reaction system, almost free from water in which no polymer could be obtained when prior catalyst such as aluminum chloride or boron trifluoride is used.

This clearly indicates the superiority of the present catalyst composition both from the standpoints of operation and efficiency.

Although the chemical structure and the catalyzing mechanism of the present catalyst composition is not clearly understood, on the premise that this invention is not bound by any particular theory, it is presumed, from the fact that the present catalyst affords a catalyzing effect which is quite unexpectable from those of aluminum chloride and boron trifluoride, that an active catalyst having an entirely new active species unknown heretofore are formed by boron trifluoride and a metal compound of the general formula, $M(OR_1)_p(OR_2)_q \cdot X_r$.

The amount of catalyst used in the process of this invention is 10–1.001 mol percent of boron trifluoride and 5–0.001 mol percent, most preferably 1–0.01 mol percent, of a metal compound $M(OR_1)_p(OR_2)_q X_r$ per mol of monomer used.

The process of this invention may be carried out either in bulk or solution polymerization procedure, batchwise or continuously. The process of this invention is particularly suitable for a continuous operation since no strict control of concentrations of water and/or alcohols in the reaction system is necessary.

Solvents which may be employed in the solution polymerization according to the process of this invention include, for example, aliphatic or aromatic hydrocarbons, halogenated alkyl and halogenated aryl or mixtures thereof.

Iso-olefins which may be polymerized according to the process of this invention include, for example, isobutylene, 2-methyl-butene-1, 2-methyl-pentene-1 and the like. Diolefins which may be copolymerized with iso-olefin according to the process of this invention are those having 4 to 10 carbon atoms and include, for example, butadiene, isoprene, 2,4-dimethylbutadiene, piperylene, cyclopentadiene, dicyclopentadiene, hexadiene, divinylbenzene, cyclohexadiene and vinylcyclohexene.

As noted above, one of the features of the process of this invention is that a polymer having a high molecular weight as compared with those of polymers obtained by using known catalysts may be obtained. For example, a solid high molecular elastomer may be obtained even at such a high temperature as 0° C. Thus, no particular restriction is imposed on the polymerization temperature and it may be chosen optionally depending upon the desired properties of the product.

The accompanying drawing illustrates the comparison of the results of polymerization of isobutylene according to the process of this invention vs. the prior art processes.

It can be noted from the drawing that a polymer having a high molecular weight is obtained at relatively higher temperature region, and that the present process affords a polymer having a higher molecular weight than those of polymers obtained in the prior art processes.

In the accompanying drawing, numerals 1, 2, 3 and 4 designate, respectively, as follows:

1—Present process
2—Process using $Al(OH)_2(OR) \cdot 2BF_3\text{-}TiCl_4$ system reported in IUPC Symposium on Macromolecules, Wiesbaden, Section IIIA–13 (1959).
3—Process using boron trifluoride as a catalyst as described in Polymer, 6, 579 (1965).
4—Process using aluminum trichloride as described in Polymer, 6, 579 (1965).

The high molecular weight polymer obtained by the process of this invention may be vulcanized by the same vulcanization process which is commonly used to vulcanize iso-olefin copolymer obtained by the conventional process, and the vulcanized product has the same physical properties such as the tensile strength, elongation, modulus, etc., as those of the conventional products.

In practising the process of this invention, the methods of supplying the materials and catalyst are such that;

(i) boron trifluoride and the metal compound are mixed first and the resulting mixture is then added to the reaction system;
(ii) boron trifluoride is introduced into the mixture of the monomer, solvent and the metal compound; and
(iii) boron trifluoride and the metal compound are introduced into the mixture of monomer and solvent separately from each other;

wherein, among these three methods, (ii) and (iii) are more favorable than (i) concerning the efficiency, stability and activity of the catalyst and reproducibility of the reaction.

Boron trifluoride may be supplied in gaseous or liquid form, or it may also be supplied in the form of a solution in a solvent.

The metal compound $M(OR_1)_p(OR_2)_qX_r$ may be supplied as such or preferably in the form of a solution.

DESCRIPTION OF PREFERRED EMBODIMENTS

The following examples show various ways in which our invention has been practised, but should not be construed as limiting the invention.

Examples 1–4

To a one liter autoclave were charged 500 cc. of n-hexane solution containing various amounts of isobutylene as specified below and various amounts of di-sec-butoxyaluminum chloride $Al(O\text{-}secBu)_2Cl$ as specified below, and, thereafter, various amounts of boron trifluoride as specified below were added to the resulting mixture with cooling and stirring. After the polymerization reaction was carried out for an hour, the reaction was terminated by adding ethanol and the resultant polymer was lyophilized overnight to give a white rubber-like polymer. The results are shown in the following Table 1 together with the results obtained in Comparative Examples 1 and 2 in which boron trifluoride was used alone:

TABLE 1

| Example Nos. | 1 | 2 | 3 | 4 | Comparative Examples | |
|---|---|---|---|---|---|---|
| | | | | | 1 | 2 |
| Amount of Al(0-sec Bu)₂ Cl (mmol./l.) | 0.5 | 2.0 | 0.5 | 0.5 | | |
| Amount of boron trifluoride (mmol./l.) | 1.5 | 4.0 | 2.5 | 1.25 | 1.5 | 4.0 |
| Iso-butylene (g.) | 33 | 33 | 33 | 65 | 33 | 33 |
| Polymerization temperature (° C.) | −45 | −45 | −75 | −20 | −45 | −45 |
| Yield (wt. percent) | 98.5 | 67 | 99.2 | 92.5 | 30 | 74.4 |
| Viscosity-average molecular weight (×10⁴) | 110 | 105 | 240 | 48 | 15 | 1 |

Examples 5–7

An autoclave was charged with 500 cc. of hexane solution containing 1.2 mols per liter of iso-butylene and 0.023 mol per liter of isoprene, and various amounts of di-sec-butoxyaluminum chloride $Al(O\text{-}sec\ Bu)_2Cl$ and boron trifluoride as specified below were added thereto with cooling and stirring. The polymerization reaction was carried out for an hour.

The results are given in the following Table 2 together with the result obtained in Comparative Example 3 in which boron trifluoride was used alone.

TABLE 2

| Example Nos. | 5 | 6 | 7 | Comparative Example 3 |
|---|---|---|---|---|
| Amount of Al(0-sec Bu)₂Cl (mmol./l.) | 2.0 | 2.0 | 2.0 | |
| Amount of boron trifluoride (mmol./l.) | 3.4 | 3.6 | 3.8 | 4.0 |
| Iso-butylene (mol./l.) | 1.2 | 1.2 | 1.2 | 1.2 |
| Isoprene (mol./l.) | 0.023 | 0.023 | 0.023 | 0.023 |
| Polymerization temperature (° C.) | −45 | −45 | −45 | −45 |
| Yield (percent) | 27.2 | 34.9 | 57.4 | 25.3 |
| Molecular weight (×10⁴) | 13.9 | 18.6 | 12.8 | 2.8 |
| Unsaturation degree [1] (mol. percent) | 0.92 | 1.16 | 1.71 | 1.27 |

[1] The unsaturation degree was measured by an iodine titration method using mercury acetate solution as described in Analytical Chemistry, 29, 751 (1857) by R. McNall et al.

Examples 8–9

To an autoclave were successively charged methyl chloride solution containing isobutylene or a mixture of isobutylene and isoprene, and benzene solution containing various amounts of aluminum di-iso-propoxy-mono-sec-butoxide $Al(O\text{-}iPr)_2(secBu)$ as specified below, and various amounts of gaseous boron trifluoride as specified below were blown thereinto with cooling and stirring.

After the polymerization reaction was carried out for an hour, the reaction was terminated by adding isopropyl alcohol and the resultant polymer was dissolved in benzene and lyophilized overnight to give a white rubber-like polymer.

The results are given in the following Table 3 together with the result obtained in Comparative Example 4 in which boron trifluoride was used alone:

TABLE 3

| Example Nos. | 8 | 9 | Comparative Example 4 |
|---|---|---|---|
| Amount of Al(O-iPr)₂(O-sec Bu) (mmol/l.) | 2.0 | 0.5 | 0 |
| Amount of boron trifluoride (cc.) | 30 | 18 | 20 |
| Iso-butylene (vol. percent) | 10 | 30 | 10 |
| Isoprene (vol. percent) | 0.2 | 0 | 0 |
| Polymerization temperature (° C.) | −45 | −45 | −45 |
| Yield (wt. percent) | 68.9 | 90.2 | 80 |
| Viscosity-average molecular weight (×10⁴) | 20.0 | 40.0 | 12.0 |
| Unsaturation degree (mol. percent) | 1.1 | | |

The foregoing Examples 1–9 show that the process of this invention affords a polymer having higher molecular weight than that of a polymer obtained by using boron trifluoride alone as a catalyst.

Example 10

To a hexane solution containing 30 g. of isobutylene were added 0.3 mmol of trichlorotitanium-n-butoxide $Ti(O\text{-}nC_4H_9)Cl_3$ and 0.4 mmol of boron trifluoride, and the polymerization reaction was carried out at −45° C. 17.2 g. of polymer having a molecular weight of 1,250,000 was obtained.

Example 11

To a mixture consisting of 34 g. of isobutylene, 0.5 g. of isoprene and 200 cc. of ethyl chloride, which was cooled to −45° C., were added 0.4 mmol of aluminum n-butoxide and 1.3 mmol of boron trifluoride, and stirred for an hour to yield 29.4 g. of polymer having a molecular weight of 230,000. The unsaturation degree of the resultant polymer was 1.21%.

Example 12

To a mixture consisting of 33 g. of isobutylene, 6 g. of butadiene and 100 cc. of n-hexane, which was cooled to −40° C., were added 0.5 mmol of trichlorotitanium-n-butoxide $Ti(O\text{-}nBu)Cl_3$ and 1.4 mmol of boron trifluoride, and the polymerization reaction was carried out for 30 minutes to give 26.8 g. of polymer having a molecular weight of 150,000. The unsaturation degree of the resultant polymer was 1.06%.

Example 13

To an autoclave charged with 10. g. of isobutylene and 120 cc. of methyl chloride, which was cooled to −25° C., was added 2 cc. of a mixture prepared by mixing 20 mmol of $Ti(O\text{-}iPr)_2(O\text{-}nBu)Cl$ and 40 mmol of gaseous boron trifluoride in 100 cc. of n-hexane, and the polymerization reaction was carried out for an hour. As a result, a white rubber-like polymer having a molecular weight of 510,000 was obtained in a yield of 94.7%.

Example 14

To a n-hexane solution containing 10 vol. percent of isobutylene was added 0.5 mmol of mono-bromo titanium tri-n-butoxide and into the resulting mixture which was cooled to −25° C. was blown 40 cc. of gaseous boron trifluoride with stirring. After the polymerization reaction was carried out for an hour, the reaction was terminated by adding isopropyl alcohol and the resultant polymer was dissolved in benzene and lyophilized to afford a white rubber-like polymer having a viscosity-average molecular weight of 200,000.

Example 15

To a toluene solution containing 30 g. of isobutylene was added 0.3 mmol of zinc diethoxide, and 30 cc. of boron trifluoride was introduced thereinto at −20° C., and the polymerization reaction was carried out for an hour. A white rubber-like polymer was obtained.

Example 16

Into a toluene solution containing 0.7 mmol of vanadium diethoxy dichloride and 33 g. of isobutylene was blown 125 cc. of boron trifluoride at −60° C. As a result, a rubber-like polymer was obtained.

Example 17

Into 500 ml. of n-hexane solution containing 33 g. of isobutylene were charged 0.3 mmol of manganese diethoxide and 30 cc. of boron trifluoride at −40° C. A solid rubber-like polymer was obtained.

Example 18

To a n-hexane solution containing 30 g. of isobutylene was added 1.0 mmol of chromium ethoxide and into the resulting mixture was introduced 60 cc. of boron trifluoride at −55° C. A white rubber-like polymer was obtained.

Example 19

To 500 ml. of n-hexane solution containing 15 g. of isobutylene was added a mixture of 120 cc. of boron trifluoride and 2 mmol. of magnesium diethoxide. A solid rubber-like polymer was obtained.

Example 20

To 500 ml. of n-hexane solution containing 1.0 mmol. of tri-meta-cresylaluminum $Al(OC_6H_4\text{-}CH_3)_3$, and 30 g. of isobutylene was charged 5 mmol. of boron trifluoride at −50° C. and the polymerization reaction was carried out for an hour. A rubber-like polymer having a molecular weight of 600,000 was obtained.

Example 21

To a n-butyl chloride solution containing 33 g. of isobutylene were added 0.5 mmol. of titanium tetrabenzyloxide $Ti(OCH_2C_6H_5)_4$ and 115 cc. of boron trifluoride at −45° C. and the polymerization reaction was carried out for an hour. As a result, a white rubber-like polymer having a molecular weight of 200,000 was obtained.

Example 22

To a toluene solution containing 30 g. of isobutylene which was cooled to −60° C. was introduced a mixture of 0.3 mmol. of titanium-tris(2-chloroethoxy)-monochloride $Ti(OCH_2\text{-}CH_2Cl)_3Cl$ and 50 cc. of boron trifluoride. As a result, a white rubber-like polymer was obtained.

Examples 23–24

To a one liter autoclave which had been sufficiently dried in vacuo were charged 60 g. of highly dehydrated and purified isobutylene, 310 g. of n-hexane, di-sec-butoxy-aluminum chloride $Al(O\text{-}secBu)_2Cl$, and various amounts of boron trifluoride as specified below was added to the resulting mixture with cooling and stirring and the polymerization was conducted.

The results are shown in the following Table 4 together with the results obtained in Comparative Examples in which boron trifluoride alone was used:

TABLE 4

| | | | Comparative Examples | | |
|---|---|---|---|---|---|
| Example Nos. | 23 | 24 | 5 | 6 | ¹ 7 |
| Amount of Al(O-secBu)₂Cl (mmol/l.) | 0.5 | 0.5 | | | |
| Amount of boron trifluoride (mmol/l.) | 1.25 | 1.5 | 2.0 | 4.0 | 2.0 |
| Polymerization temperature (° C.) | 0 | 0 | 0 | 0 | 0 |
| Yield (percent) | 79.2 | 92.3 | Trace | Trace | 21.2 |
| Viscosity-average molecular weight (×10⁴) | 18.0 | 18.5 | | | 0.83 |

¹ In this example, incompletely dehydrated and purfied isobutylene was used.

As will be seen from the Comparative Examples 5, 6 and 7, with the use of the known Friedel-Crafts type catalysts, the polymerization hardly proceeds when there is substantially no water, and further the yield of the product polymer is greatly affected by the presence of a small amount of water.

Whereas, when using the catalyst composition of this invention, as shown in Examples 23 and 24, the polymer may be invariably obtained in a good yield even if there is substantially no water. Furthermore, the resultant polymer has a remarkably high molecular weight even when the polymerization reaction is carried out at such a high temperature as 0° C.

Examples 25–27

To a one liter autoclave charged with various amounts of isobutylene, isoprene as specified below and methyl chloride, were charged various amounts of

and boron trifluoride as specified below with cooling and stirring and the polymerization was carried out for an hour. The results are given in the following Table 5:

TABLE 5

| Example Nos. | 25 | 26 | 27 |
|---|---|---|---|
| Amount of Al(O-secBu)₂Cl (mmol/l.) | 1.5 | 1.5 | 1.5 |
| Amount of boron trifluoride (mmol/l.) | 4.5 | 3.0 | 4.5 |
| Iso-butylene (mol/l.) | 1.2 | 2.4 | 1.2 |
| Isoprene (mol/l.) | 0.024 | 0.072 | 0.096 |
| Polymerization temperature (° C.) | −65 | −74 | −80 |
| Mooney viscosity (ML-8-100) | 43.0 | 83.5 | 45.5 |
| Yield (percent) | 99.1 | 74.3 | 98.2 |
| Unsaturated degree (mol percent) | 1.21 | 2.34 | 3.05 |

The sample polymers obtained in Examples 25, 26 and 27 were compounded according to the recipe given in the following Table 6 and vulcanized at 150° C., respectively.

The physical properties of the samples thus prepared were measured, respectively, and the results are summarized in the Table 7:

TABLE 6

| Compound | Parts by weight |
|---|---|
| Polymer | 100 |
| Easily processing channel black | 50 |
| Zinc oxide | 5 |
| Stearic acid | 3 |
| Mercaptobenzothiazol | 0.5 |
| Tetramethyl thiuram disulfide | 1 |
| Sulfur | 2 |

TABLE 7

| Example Nos. | 25 | 26 | 27 |
|---|---|---|---|
| Scorching time (121° C.) | 34'40" | 16'00" | 22'20" |
| Compound Mooney (ML-8-150) | 52.0 | 77.5 | 55.0 |
| Tensile strength: | | | |
| Vulcanized for 40 min. (kg./cm.²) | 212 | 221 | 187 |
| Vulcanized for 80 min. (kg./cm.²) | 209 | 213 | 200 |
| Elongation: | | | |
| Vulcanized for 40 min. (percent) | 760 | 580 | 490 |
| Vulcanized for 80 min. (percent) | 760 | 590 | 580 |
| 300% modulus: | | | |
| Vulcanized for 40 min. (kg./cm.²) | 48 | 81 | 96 |
| Vulcanized for 80 min. (kg./cm.²) | 51 | 75 | 78 |
| Hardness | 64 | 67 | 68 |

Examples 25, 26 and 27 clearly indicate that the polymers synthetized according to the process of this invention are copolymers of isobutylene and isoprene and further show that elastomers having quite excellent physical properties may be obtained by vulcanizing the resultant copolymers.

Examples 28–30

To a one liter autoclave were charged 500 ml. of n-hexane solution containing isobutylene and various amounts of Al(O-secBu)₃ as specified below and various amounts of gaseous boron trifluoride as specified below was blown thereinto with cooling and stirring. After the polymerization reaction was carried out for an hour, the reaction was terminated by adding ethanol and the resultant polymer was lyophilized overnight to give a white rubber-like polymer. The results are shown in the following Table 8 together with the results obtained in Comparative Examples in which boron trifluoride alone was used:

TABLE 8

| Example Nos. | 28 | 29 | 30 | Comparative Examples | |
|---|---|---|---|---|---|
| | | | | 8 | 9 |
| Amount of Al(O-secBu)₃ (mmol/l.) | 0.5 | 0.5 | 1.0 | | |
| Amount of boron trifluoride (mmol/l.) | 1.5 | 2.0 | 3.0 | 1.6 | 4.1 |
| Iso-butylene (g.) | 34 | 34 | 34 | 32 | 35 |
| Polymerization temperature (° C.) | −45 | −45 | −20 | −45 | −45 |
| Yield (wt. percent) | 67.4 | 70.5 | 77.6 | 31 | 75.3 |
| Viscosity-average molecular weight (×10⁴) | 109 | 110 | 25.8 | 14 | 11 |

Examples 31–33

To an autoclave charged with 500 ml. of methyl chloride solution containing 1.2 mol per liter of isobutylene and 0.023 mol per liter of isoprene which was cooled were added a predetermined amount of Al(O-nBu)₃ dissolved in methyl chloride and various amounts of gaseous boron trifluoride as specified below slowly in the course of 20 minutes, separately, and the polymerization reaction was carried out for an hour.

The results are shown in the following Table 9 together with the result obtained in Comparative Example in which boron trifluoride alone was used:

TABLE 9

| Example | 31 | 32 | 33 | Comparative Example 10 |
|---|---|---|---|---|
| Amount of Al(O-nBu)₃ (mmol./l.) | 1.5 | 1.5 | 1.5 | |
| Amount of boron trifluoride (m.mol./l.) | 4.5 | 3.0 | 3.0 | 4.0 |
| Iso-butylene (mol./l.) | 1.2 | 1.2 | 1.2 | 1.20 |
| Isoprene (mol./l.) | 0.023 | 0.023 | 0.023 | 0.023 |
| Polymerization temperature (° C.) | −78 | −60 | −78 | −78 |
| Yield (percent) | (¹) | 58.8 | 60.5 | 97.8 |
| Molecular weight (×10⁴) | 92 | 31.1 | 102 | 10.5 |
| Unsaturation degree (mol. percent) | 1.20 | 1.07 | 1.15 | 1.27 |

¹ Approximately 100.

The foregoing Examples 28–33 show that the process of this invention affords a polymer having far higher molecular weight than that of a polymer obtained by using boron trifluoride alone as a catalyst.

Examples 34–35

To a methyl chloride solution containing 2-methylbutene-1 or a mixture of 2-methylbutene-1 and isoprene which was cooled and stirred was added various amounts of aluminum di-iso-propoxy-mono-sec-butoxide

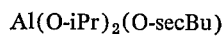

Al(O-iPr)₂(O-secBu)

as specified below. Subsequently, there was introduced gaseous boron trifluoride into the polymerization system and the polymerization reaction was carried out for an hour. At the end of the period, the reaction was terminated by adding isopropyl alcohol and the resultant polymer was dissolved in benzene and lyophilized to give a white polymer. The results are shown in the following Table 10:

TABLE 10

| Example Nos. | 34 | 35 |
|---|---|---|
| Amount of Al(O-iPr)₂(O-secBu) (mmol/l.) | 2.1 | 0.6 |
| Amount of boron trifluoride (cc.) | 30 | 19 |
| 2-methylbutene-1 (vol. percent) | 11 | 30 |
| Isoprene (vol. percent) | 0.2 | |
| Polymerization temperature (° C.) | −45 | −45 |
| Viscosity-average molecular weight (10,000) | 16 | 30 |
| Unsaturation degree (mol. percent) | 0.8 | |

Examples 36–38

To a one liter autoclave charged with various amounts of isobutylene, isoprene as specified below and methyl chloride which was cooled, and stirred, were charged various amounts of Al(O-secBu)₃ and boron trifluoride as specified below, separately, and the polymerization reaction was carried out for an hour. The results are shown in the following Table 11:

TABLE 11

| Example Nos. | 36 | 37 | 38 |
|---|---|---|---|
| Amount of Al(O-secBu)₃ (mmol/l.) | 1.6 | 1.4 | 1.5 |
| Amount of boron trifluoride (mmol/l.) | 4.0 | 4.0 | 4.5 |
| Iso-butylene (mol./l.) | 2.4 | 2.4 | 2.4 |
| Isoprene (mol./l.) | 0.072 | 0.030 | 0.096 |
| Polymerization temperature (° C.) | −70 | −55 | −78 |
| Mooney viscosity | 80.0 | 46.5 | 47.0 |
| Yield (percent) | 74.0 | 80.3 | 84.1 |
| Unsaturation degree (mol. percent) | 1.78 | 0.81 | 2.20 |

The polymers obtained in Examples 36, 37 and 38 were compounded according to the recipe given in the following Table 12 and vulcanized at 150° C., respectively.

The physical properties of the samples thus prepared were measured, respectively, and the results are summarized in the Table 13:

TABLE 12

| Compound: | Parts by weight |
|---|---|
| Polymer | 100 |
| Easily processing channel black | 50 |
| Zinc oxide | 5.0 |
| Stearic acid | 3.0 |
| Mercaptobenzothiazol | 0.5 |
| Tetramethyl thiuram disulfide | 1.0 |
| Sulfur | 2.0 |

TABLE 13

| Example Nos. | 36 | 37 | 38 |
|---|---|---|---|
| Cure index (121° C.) | 7'10" | 11'10" | 6'00" |
| Compound Mooney (ML-8-121) | 75 | 60 | 56 |
| Tensile strength: | | | |
|   Vulcanized for 40 min. (kg./cm.$^2$) | 205 | 212 | 186 |
|   Vulcanized for 80 min. (kg./cm.$^2$) | 205 | 205 | 170 |
| Elongation: | | | |
|   Vulcanized for 40 min. (kg./cm.$^2$) | 590 | 760 | 520 |
|   Vulcanized for 80 min. (kg./cm.$^2$) | 630 | 770 | 570 |
| 300% modulus: | | | |
|   Vulcanized for 40 min. (kg./cm.$^2$) | 97 | 45 | 98 |
|   Vulcanized for 80 min. (kg./cm.$^2$) | 71 | 46 | 78 |
| Hardness | 62 | 61 | 63 |

Examples 36, 37, and 38 clearly indicate that the polymers synthetized according to the process of this invention are copolymers of isobutylene and isoprene and further show that elastomers having quite excellent physical properties may be obtained by vulcanizing the resultant copolymers.

The aforementioned IUPC IIIA–13 (1959) by O. Wichterle et al. and J. Polymer Sci., 53, 281 (1961) are only literatures available to date with regard to observations on the polymerization of iso-olefin, particularly on the catalyst activities in the cation polymerization of iso-olefin, in which certain catalysts obtained by reacting boron trifluoride as a member of metal halides with aluminum alkoxide as a member of metal alkoxides are used.

As described by O. Wichterle et al., when aluminum alkoxide is dissolved in n-hexane and a large amount of boron trifluoride is introduced thereinto at a normal temperature, an isoluble matter is produced. The property of such an isoluble matter varies dependent upon the type of aluminum alkoxide used. For example, the combination of aluminum alkoxide containing a primary alkyl group and boron trifluoride leads to a heterogeneous reaction and a precipitate of aluminum fluoride-boron trifluoride complex is formed. Also it is believed by O. Wichterle et al. that when $Al(O\text{-}secC_4H_9)_3$ is reacted with boron trifluoride, a green gel-like matter presumably having such structures as $$Al(O\text{-}secC_4H_9)_3 \cdot 2BF_3, \quad Al(O\text{-}secC_4H_9)(OH)_2 \cdot 2BF_3$$

is formed as in the following chemical equation:

$$AL(O\text{-}secC_4H_9)_3 + BF_3 \rightarrow Al(O\text{-}secC_4H_9)_3 \cdot 2BF_3 \rightarrow$$
$$Al(O\text{-}secC_4H_9) \cdot (OH)_2 \cdot 2BF_3 + 2C_4H_8$$

However, O. Wichterle et al. stated in IUPC IIIA–13 (1959), p. 1, that such insoluble matters as they are exhibit no catalytic activity in the polymerization or copolymerization of isobutylene and they could not be used as a polymerization catalyst in the synthesis of any polymer.

Further, O. Wichterle et al. reported that if titanium tetrachloride is added to the reaction mixture of aluminum alkoxide and boron trifluoride, a catalyst activity is manifested for the first time and it can be used in the polymerization of isobutylene as a heterogeneous catalyst.

The foregoing Examples 28–38, on the other hand, show that homopolymer or copolymer of iso-olefin having a high molecular weight can be obtained by introducing boron trifluoride into a mixture of iso-olefin and $Al(OR)_3$ or a mixture of iso-olefin, diolefin copolymerizable with iso-olefin and $Al(OR)_3$, or by introducing aluminum compound and boron trifluoride separately from each other into the mixture of the above-mentioned monomer and solvent.

We claim:

1. A process for producing high molecular weight polymers which comprises polymerizing iso-olefin in the presence of a catalyst composition consisting essentially of boron trifluoride and compound of the general formula:

$$M(OR_1)_p(OR_2)_qX_r$$

wherein M represents a metal of the Group II–VII of the Periodic Table, $R_1$ and $R_2$ which may be the same or different represent a member selected from the group consisting of alkyl, cycloalkyl, aryl and aralkyl groups which may be substituted with halogen, X represents a halogen atom, p, q and r represent an integer, respectively, and a sum of p, q and r corresponds to the valency of the metal provided that p and q are not zero simultaneously.

2. A process for producing high molecular weight polymers which comprises copolymerizing iso-olefin with at least one diolefin having 4 to 10 carbon atoms copolymerizable therewith in the presence of a catalyst composition consisting essentially of boron trifluoride and a compound of the general formula:

$$M(OR_1)_p(OR_2)_qX_r$$

wherein M represents a metal of the Group II–VII of the Periodic Table, $R_1$ and $R_2$ which may be the same or different represent a member selected from the group consisting of alkyl, cycloalkyl, aryl and aralkyl groups which may be substituted with halogen, X represents a halogen atom, p, q and r represent an integer, respectively, and a sum of p, q and r corresponds to the valency of the metal provided that p and q are not zero simultaneously.

3. A process according to claim 1 wherein said iso-olefin is a member selected from the group consisting of isobutylene, 2-methyl-butene-1 and 2-methyl-pentene-1.

4. A process according to claim 2 wherein said iso-olefin is a member selected from the group consisting of isobutylene, 2-methyl-butene-1 and 2-methyl-pentene-1, and said diolefin is a member selected from the group consisting of butadiene, isoprene, 2,4-dimethylbutadiene, piperylene, cyclopentadiene, dicyclopentadiene, hexadiene, divinylbenzene, cyclohexadiene and vinylcyclohexene.

5. A process according to claim 1 wherein the amount of said catalyst used is 10–0.001 mol percent of boron trifluoride and 5–0.001 mol percent, most preferably 1–0.01 mol percent, of a metal compound $$M(OR_1)_p(OR_2)_qX_r$$

per mol of the monomer used.

6. A process according to claim 2 wherein the amount of said catalyst used is 10–0.001 mol percent of boron trifluoride and 5–0.001 mol percent, most preferably 1–0.01 mol percent, of a metal compound $$M(OR_1)_p(OR_2)_qX_r$$

per mol of the monomer used.

7. A process for producing high molecular weight polymers which comprises polymerizing iso-olefin by introducing boron trifluoride into a mixture of iso-olefin monomer, solvent and aluminum compound of the general formula $Al(OR)_3$ wherein R which may be the same or different represents a member selected from the group consisting of alkyl, cycloalkyl, aryl, aralkyl groups which may be substituted with halogen.

8. A process for producing high molecular weight polymers which comprises polymerizing iso-olefin by introducing boron trifluoride and aluminum compound of the general formula $Al(OR)_3$ wherein R which may be the same or different represents a member selected from the group consisting of alkyl, cycloalkyl, aryl, aralkyl groups which may be substituted with halogen, into a mixture of iso-olefin and a solvent sepaartely from each other.

9. A process for producing high molecular weight copolymers which comprises copolymerizing iso-olefin with at least one diolefin having 4 to 10 carbon atoms copolymerizable therewith by introducing boron trifluoride into a mixture of iso-olefin, said diolefin and aluminum compound of the general formula $Al(OR)_3$ wherein R which may be the same or different represents a member selected from the group consisting of alkyl, cycloalkyl, aryl, aralkyl groups which may be substituted with halogen.

10. A process for producing high molecular weight copolymers which comprises copolymerizing iso-olefin with at least one diolefin having 4 to 10 carbon atoms copolymerizable therewith by introducing boron trifluoride and aluminum compound of the general formula $Al(OR)_3$ wherein R which may be the same or different represents a member selected from the group consisting of alkyl, cycloalkyl, aryl, and aralkyl groups which may be substituted with halogen into a mixture of said iso-olefin, said diolefin and a solvent, separately from each other.

11. A process according to claim 7 wherein said iso-olefin is a member selected from the group consisting of isobutylene, 2-methyl-butene-1 and 2-methyl-pentene-1.

12. A process according to claim 9 wherein said iso-olefin is a member selected from the group consisting of isobutylene, 2-methyl-butene-1 and 2-methyl-pentene-1, and said diolefin is a member selected from the group consisting of butadiene, isoprene, 2,4-dimethyl-butadiene, hexadiene, divinylbenzene, cyclohexadiene and vinyl cyclohexene.

13. A process according to any of claims 7—10 wherein said boron trifluoride being used in an amount of 10–0.001 mol percent, and said aluminum compound $Al(OR)_3$ being used in an amount of 5–0.001 mol percent, most preferably 1–0.01 mol percent per mol of the monomer used.

14. A process according to claim 7 wherein said solvent is methyl chloride.

References Cited

UNITED STATES PATENTS

| | | | |
|---|---|---|---|
| 2,440,750 | 5/1948 | Kraus et al. | 252—223.3 |
| 2,931,791 | 4/1960 | Ernst et al. | 260—85.3 |
| 3,262,887 | 7/1966 | Calfee | 252—429 |

JAMES A. SEIDLECK, Primary Examiner

R. A. GAITHER, Assistant Examiner

U.S. Cl. X.R.

260—82.1, 88.2, 93.7, 94.8